United States Patent
Janz

(10) Patent No.: US 6,637,825 B2
(45) Date of Patent: Oct. 28, 2003

(54) SAFETY BELT-REVERSING DEVICE ON A MOTOR VEHICLE SEAT

(76) Inventor: Norbert Janz, Starstrasse 21, D-14612 Falkensee (DE)

( * ) Notice: Subject to any disclaimer, the term of this patent is extended or adjusted under 35 U.S.C. 154(b) by 0 days.

(21) Appl. No.: 10/099,713

(22) Filed: Mar. 14, 2002

(65) Prior Publication Data

US 2003/0094845 A1 May 22, 2003

(30) Foreign Application Priority Data

Nov. 17, 2001 (DE) .......................................... 101 56 599

(51) Int. Cl.[7] .......................... A47C 31/00; B60R 22/00
(52) U.S. Cl. ....................... 297/468; 297/470; 297/471; 297/472; 280/808
(58) Field of Search ................................. 297/483, 484, 297/471, 468, 470, 472; 280/808

(56) References Cited

U.S. PATENT DOCUMENTS

| | | | | |
|---|---|---|---|---|
| 3,632,060 A | * | 1/1972 | Balder ...................... 242/379.1 |
| 4,789,079 A | * | 12/1988 | Kobayashi et al. .......... 221/232 |
| 5,447,423 A | * | 9/1995 | Fuisz et al. ..................... 425/9 |
| 5,544,917 A | * | 8/1996 | Loxton et al. ............. 280/801.2 |
| 5,599,070 A | * | 2/1997 | Pham et al. ................. 297/483 |
| 5,645,316 A | * | 7/1997 | Aufrere et al. ......... 297/216.13 |
| 5,658,051 A | * | 8/1997 | Vega et al. .................. 297/483 |
| 5,681,081 A | * | 10/1997 | Lindner et al. ......... 297/216.13 |
| 5,716,073 A | * | 2/1998 | Redman ................... 280/801.1 |
| 5,722,732 A | * | 3/1998 | Haldenwanger ............ 297/483 |
| 5,823,627 A | * | 10/1998 | Viano et al. ................. 297/471 |
| 5,988,758 A | * | 11/1999 | Heintzelman et al. ...... 297/483 |
| 6,045,186 A | * | 4/2000 | Butt et al. ................... 297/296 |
| 6,513,747 B1 | * | 2/2003 | Lee et al. .................... 242/374 |

* cited by examiner

Primary Examiner—Peter M. Cuomo
Assistant Examiner—Sarah C Burnham
(74) Attorney, Agent, or Firm—Collard & Roe, PC

(57) ABSTRACT

A safety belt-reversing device on a vehicle seat, having a sheet metal body connected with a base construction of the seat. The sheet metal body comprises a surface on which the belt is running in the form of a saddle, and stiffening tabs connected on the face sides of the saddle, as well as foot elements projecting from the underside. A belt-guiding element, for example in the form of a bow, is arranged in the area of the ridge of the saddle above the surface on which the belt is running, for limiting a slot for the belt. The ridge area of the saddle is rounded in the direction in which the belt is running and, in the transverse direction thereto, has upwardly shaped ears. The foot elements in the form of sheet metal tabs are secured on a cross bar of the base construction of the seat so that the face-side tabs of the sheet metal body are spaced from the cross bar.

12 Claims, 2 Drawing Sheets

SAFETY BELT-REVERSING DEVICE ON A MOTOR VEHICLE SEAT

BACKGROUND OF THE INVENTION

Field of the Invention

The invention relates to a device for reversing the movement of a seat belt on the seat of a motor vehicle. In motor vehicles, seat belt reversing devices are secured on the seat of a motor vehicle such as a bench seat for several persons adjacent to sliding side doors, and in vehicles without a top, for example convertibles or beach vehicles. These seat belt reversing devices are for guiding safety belts. The belt-reversing device has to guide the safety belt so that the belt can be comfortably handled and rests on the body in a manner comfortable for the person wearing it. Furthermore, during an accident or a crash situation, the belt-reversing device should not cause an injury. In addition, this reversing device should reduce injuries to the head to the highest possible degree.

SUMMARY OF THE INVENTION

The invention is based on the problem of proposing a seat belt-reversing device for the seat of a motor vehicle that has a simple construction and satisfies the requirements specified above.

The object and the solution to this problem is a safety belt-reversing device mounted on the seat of a motor vehicle. This device comprises a sheet metal body connected with a seat base construction of the motor vehicle seat. This sheet metal body has a surface on which the belt is running that is designed in the form of a saddle and comprises reinforcing tabs connected on the face sides of the saddle, and foot elements projecting from the underside.

There is also a belt-guiding element arranged in the area of the ridge of the saddle above the surface on which the belt running, for limiting a slot for the passage the belt.

There is also a ridge area of the saddle which is rounded in the direction in which the belt is running. This ridge section has upwardly shaped ears in the transverse direction thereto, wherein these ears are laterally limiting the area in which the belt is running. In addition, the foot elements are in the form of sheet metal tabs and are secured on both sides of a cross bar of the base construction of the seat. Thus, the face-side tabs of the sheet metal body are spaced from the cross bar.

The sheet metal body can be manufactured with a simple design in the form of a punched, molded part. The ears, shaped into the area of the ridge, possess high rigidity and prevent the safety belt from slipping sideways. The foot elements are shaped in the form of sheet metal strips and are designed so that they buckle away under the stresses occurring in a crash situation. In this case, the sheet metal body sags down to the stop of the face-side tabs on the cross bar. Because of the sagging of the sheet metal body under the stress acting on the belt in an accident situation, the spacing of the belt-reversing device from the head of the person wearing the safety belt increases. The hazard of causing head injuries is thus reduced. The deformation of the foot elements has a favorable effect on the initiation of the retaining forces acting on the body of the person wearing the safety belt.

The belt-guiding element is preferably formed as a bow that is secured on the face sides of the saddle. Furthermore, it is possible to mount a plastic cap on the sheet metal body that acts as the element that guides the belt.

The belt-reversing device can be secured at any desired point along a cross bar of the base construction of the seat, specifically in a manner as required when the device is installed given in a concrete case. The device is connected so that the ridge area of the saddle is slanted in relation to the cross bar according to the direction in which the belt is running. The saddle is preferably steep on the side on which the belt is running into the device. On the side on which the belt is pulled out, the saddle has a sliding surface with a gradient following the run of the belt as it is being pulled out.

On the side on which the belt is let into the device, the foot element has an outward molding with a curved cross section. This molding, a protruding reversing surface, extends transversely to the direction in which the belt is running. The outward molding of the foot element forms another reversing surface that is useful if the safety belt is extending steeply upwards, following the base construction of the seat.

The sheet metal body may have a sliding coating reducing the frictional resistance. The sliding coating preferably consists of a fluorine polymer matrix wherein reinforcing substances are incorporated in the matrix, with the thickness of the coating being less than 100 $\mu$m. While the fluorine polymer matrix provides the sliding coating with adequate thermal stability, the incorporated reinforcing substances, which are preferably particle-shaped, create an adequate resistance to abrasion. The low thickness of the coating of less than 100 $\mu$m, preferably of 15 to 80 $\mu$m, assures good dissipation of heat into the metal body. This result has a favorable effect on the heating of the surface on which the belt is running caused in a crash situation. Furthermore, the coating described above creates a lower emission of noise when the belt is pulled out, as compared to plastic or chrome-plated covers.

While the foot elements of the belt-reversing device are designed so that they yield by buckling outwards under the stresses acting on the belt in a crash situation, the saddle has to have high dimensional stability. The tabs re-formed and connected with each other on the face sides of the saddle satisfy an important stiffening function. These tabs are usefully connected with one another by means of rivets.

The belt-reversing device secured on the seat of the vehicle is preferably covered with shock-absorbing materials both for optical reasons and for preventing any risk of injury. Various design possibilities are available in this regard. According to one embodiment, one of the foot elements, and a lower section of the saddle are surrounded by cushioning for the vehicle seat, whereby the area of the ridge of the saddle protrudes from the cushioning of the vehicle seat. A cover cap made of plastic may be mounted on the section projecting beyond the cushioning. This cover cap is mounted both on the side on which the belt runs into the device, and on the side it is pulled from this device. This plastic cover cap has an eye for the safety belt to pass through. In an alternative embodiment, there can also be a plastic cap covering the belt inlet arranged above the sheet metal body. This safety belt can run in on the underside of the plastic cap, and, following reversal on the saddle, can exit from an opening in the plastic cap. The plastic cap may be integrated in a lining of the vehicle seat, whereby the safety belt is also running within the covering of the seat.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
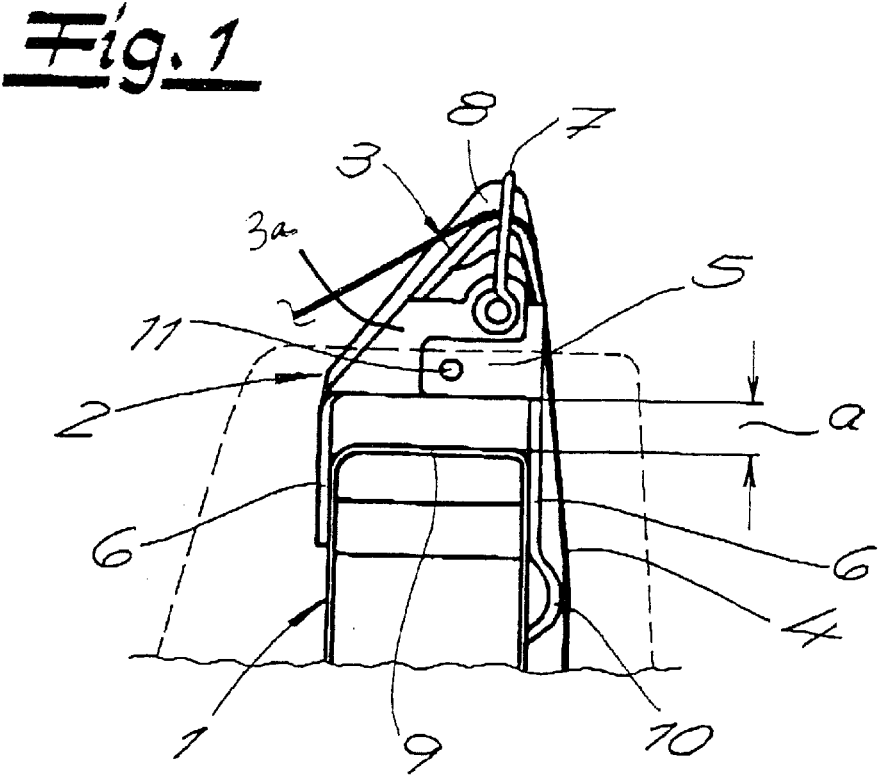
FIG. 1 shows a front view of a belt-reversing device mounted on the base construction of a vehicle seat.

Referring to the drawings, FIG. 1 shows the belt-reversing device which is mounted on the seat of a motor vehicle. A sheet metal body 2 which is connected with a seat base construction 1 is an essential component of the belt-reversing device. Sheet metal body 2 comprises a surface on which the belt is running and has the shape of a saddle 3 for a safety belt 4 coming from a belt retractor. There are tabs 5, which are interconnected on the face sides or side faces 3a of saddle 3 for stiffening purposes; and foot elements 6 projecting from the underside. A belt-guiding element 7 is for limiting a slot for the belt which is arranged in the area of the ridge of saddle 3 above the surface on which the belt is running. In the present embodiment, belt-guiding element 7 is formed as a bow that is secured on the face sides or side faces 3a of saddle 3.

Figure 2:
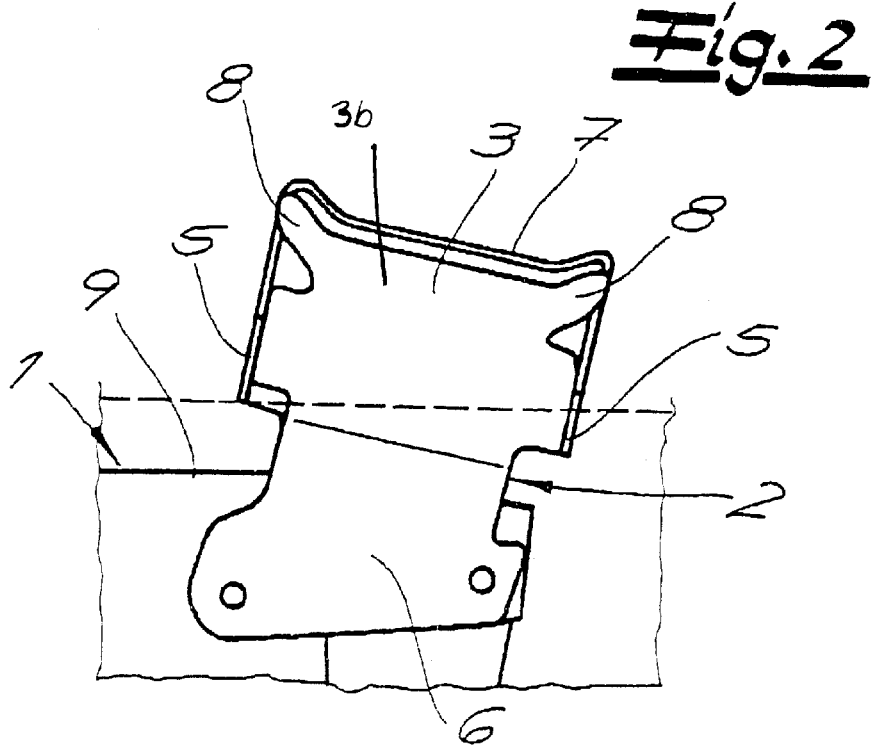
FIG. 2 is a face side view of the object shown in FIG. 1.

The ridge area is rounded in the direction in which the belt is running. This ridge area is pointed in the direction transversely thereto and has upwardly shaped ears 8 that limit the running area of the belt sideways. Ears 8 possess high dimensional stability and prevent safety belt 4 from slipping sideways. The ridge area of saddle 3 is aligned slanted in relation to a cross bar 9 of the base construction of the seat. This design is in accordance with the way in which the belt is running. FIG. 2, shows, furthermore, a face side 3b of saddle 3, wherein saddle 3 is steep on the belt inlet side, and that it has a sliding surface adapted to the pull-out movement of the belt on the side where the belt exits. Furthermore, on the belt inlet side, foot element 6 may have an outward molding 10 with a curved cross section. This molding extends transversely in relation to the direction in which the belt is running as a protruding reversing surface. No other guiding elements for guiding the safety belt are required between outward molding 10, serving as a sliding and reversing surface, and a belt retractor, installed in the foot zone of the seat.

Foot elements 6 are formed as sheet metal tabs and are arranged on both sides on cross bar 9 of the base construction of the seat. Foot elements 6 are secured on cross bar 9 so that face-side tabs 5 of sheet metal body 2 have a spacing "a" from the cross bar, which may amount to, for example between 5 mm and 20 mm. Foot elements 6 are designed so that they yield by buckling outwards when the belt is stressed under the load during an accident. Thus, sheet metal body 2 will sag downwards until the face sides of saddle 3 impact cross bar 9 of the base construction of the seat.

During a crash, the downwardly directed movement of sheet metal body 2 causes the spacing of the belt-reversing device to increase from the head of the buckled-up person. This effect reduces the danger of head injuries. At the same time, the deformation of foot elements 6 has a favorable effect on the initiation of the retaining forces acting on the body of the person wearing the safety belt. While such deformability of the foot elements is desirable, saddle-shaped sheet metal body 2 must have high dimensional stability. The re-formed, face-side tabs 5 of saddle 3 are connected with each other for this purpose, for example by means of rivet connectors 11.

Sheet metal body 2 may comprise a sliding coating reducing the frictional resistance. The sliding coating preferably consists of a fluorine polymer matrix and reinforcing substances incorporated therein, and has a layer thickness of less than 100 $\mu$m.

For optical reasons and for the purpose of further minimizing the risk of injury, the belt-reversing device is covered with shock-absorbing plastics. In the embodiment shown in FIGS. 1 and 2, foot elements 6, as well as a lower section of saddle 3 are surrounded by a cushioning of the vehicle seat, whereby the area of the ridge protrudes from the cushioning of the vehicle seat. The cushioning is indicated in FIGS. 1 and 2 by a dashed line.

Figure 3:
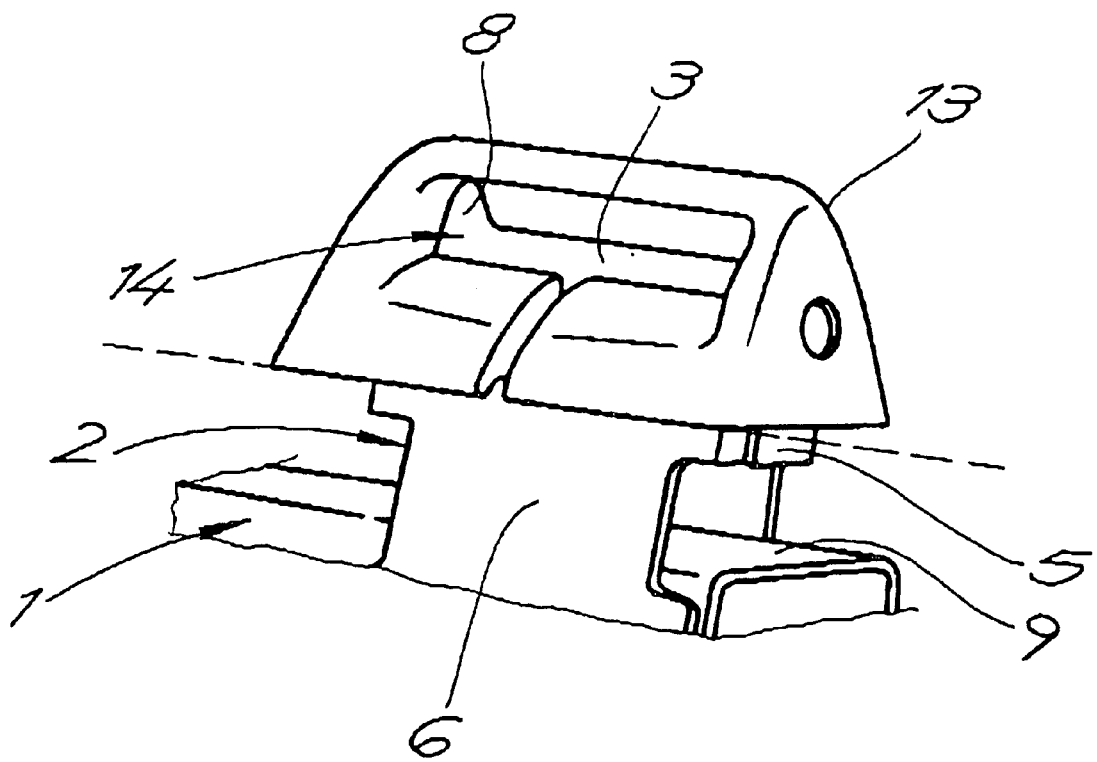
FIG. 3 shows another embodiment of t he belt-reversing device.

In the embodiment shown in FIG. 3, a plastic cap 13 covering the belt inlet is disposed above sheet metal body 2, whereby safety belt 4 can be admitted to the underside of plastic cap 13. In addition, after having been reversed on saddle 3 of sheet metal body 2, safety belt 4 exits from an opening 14 for the belt in the plastic cap. Plastic cap 13 can be integrated in a cover of the vehicle seat. Safety belt 4 is admitted within the cover of the seat.

Accordingly, while at least one embodiment of the present invention have been shown and described, it is obvious that many changes and modifications may be made thereunto without departing from the spirit and scope of the invention.

What is claimed is:

1. A safety belt-reversing device for a belt on a motor vehicle seat, the device comprising:
   (a) a sheet metal body coupled to the base of the seat, said sheet metal body comprising:
      (i) a saddle acting as a running surface, said saddle having a ridge, a belt inlet side, a belt outlet side, a lower section, and face sides;
      (ii) a plurality of stiffening tabs coupled to said face sides of said saddle;
      (iii) a plurality of foot elements formed as oppositely spaced sheet metal tabs; and
      (iv) a plurality of upwardly shaped ears extending up from said saddle, said ears for limiting an area on which the belt runs sideways;
   (b) a belt guiding element arranged in a ridge of said saddle, above a surface on which the belt is running, and for limiting a slot for the belt; and
   (c) a horizontally aligned cross bar coupled on both sides to said foot elements wherein said cross bar is spaced apart from said plurality of stiffening tabs, and wherein said plurality of foot elements are designed so that they buckle away under the stresses occurring in a crash situation, and said sheet metal body sags down to a point where the stiffening tabs touch a top of said horizontally aligned cross bar.

2. The belt-reversing device as in claim 1, wherein said belt guiding element is in the form of a bow secured on the face sides of said saddle.

3. The belt-reversing device as in claim 1, further comprising a plastic cap serving as said belt guiding element arranged above said sheet metal body.

4. The belt-reversing device as in claim 1, wherein said saddle ridge area is aligned slanted in relation to said cross bar based upon a way in which said belt is running.

5. The belt-reversing device as in claim 1, wherein said saddle is steep on s aid belt inlet side and has a sliding surface on a belt outlet side with a gradient adapted to a pullout movement of the belt.

6. The belt-reversing device as in claim 1, wherein said foot element has an outward molding having a curved cross-section extending transverse to a running direction of the belt as a protruding reversing surface.

7. The belt-reversing device as in claim 1, wherein said sheet metal body has a sliding surface reducing the frictional resistance of the belt on said sheet metal body.

8. The belt-reversing device as in claim 7, wherein said sliding surface comprises a fluorine polymer matrix and reinforcing substances coupled in and has a layer thickness of less than 100 $\mu$m.

9. The belt-reversing device as in claim 1, wherein said tabs are molded onto the face sides of the saddle and are connected by rivet connectors.

10. The belt-reversing device as in claim 1, wherein said foot elements and a lower section of said saddle are surrounded by cushioning of the seat.

11. The belt-reversing device as in claim 10, wherein a cover cap, made of plastic, is mounted on a section protruding from the cushioning, wherein said cover cap has an eye on each of the belt inlet and outlet sides of said saddle.

12. The belt-reversing device as in claim 1, further comprising a plastic cap covering a belt inlet and arranged above said sheet metal body wherein the belt is admitted to an underside of said plastic cap and wherein the belt reverses on said saddle of sheet metal body and exits from an opening in said plastic cap wherein said plastic cap is integrated in a cover of the vehicle seat and whereby said safety belt is admitted within said cover.

* * * * *